United States Patent
Ko et al.

(10) Patent No.: US 10,084,200 B2
(45) Date of Patent: Sep. 25, 2018

(54) ELECTRODE ASSEMBLY WITH IMPROVED STABILITY AND METHOD OF MANUFACTURING THE SAME

(71) Applicant: LG CHEM, LTD., Seoul (KR)

(72) Inventors: Myung Hoon Ko, Daejeon (KR); Ji Won Park, Daejeon (KR); Jin Ho Ban, Daejeon (KR); Ah Reum Jung, Daejeon (KR); Seung Ho Na, Daejeon (KR)

(73) Assignee: LG CHEM, LTD., Seoul (KR)

( * ) Notice: Subject to any disclaimer, the term of this patent is extended or adjusted under 35 U.S.C. 154(b) by 470 days.

(21) Appl. No.: 14/468,786

(22) Filed: Aug. 26, 2014

(65) Prior Publication Data

US 2014/0363727 A1    Dec. 11, 2014

Related U.S. Application Data

(63) Continuation of application No. PCT/KR2014/001268, filed on Feb. 17, 2014.

(30) Foreign Application Priority Data

Feb. 15, 2013  (KR) .................. 10-2013-0016512
Feb. 17, 2014  (KR) .................. 10-2014-0017701

(51) Int. Cl.
*H01M 2/18* (2006.01)
*H01M 10/04* (2006.01)
(Continued)

(52) U.S. Cl.
CPC ... *H01M 10/0413* (2013.01); *H01M 10/0463* (2013.01); *H01M 10/0472* (2013.01);
(Continued)

(58) Field of Classification Search
CPC ......... H01M 10/0413; H01M 10/0459; H01M 10/0463; H01M 10/0472; H01M 10/052;
(Continued)

(56) References Cited

U.S. PATENT DOCUMENTS 7,384,705 B2     6/2008  Kezuka et al.
2001/0005561 A1  6/2001  Yamada et al.
(Continued)

FOREIGN PATENT DOCUMENTS

CN   102210053 A    10/2011
EP   2 337 107 A1    6/2011
(Continued)

OTHER PUBLICATIONS

Original publication of KR 10-2003-0066960, Aug. 14, 2003, K-pion.*
(Continued)

*Primary Examiner* — Lingwen R Zeng
(74) *Attorney, Agent, or Firm* — Birch, Stewart, Kolasch & Birch, LLP (57) ABSTRACT

An electrode assembly includes a cell stack part having (a) a structure in which one kind of radical unit is repeatedly disposed, or (b) a structure in which at least two kinds of radical units are disposed in a predetermined order. The one kind of radical unit has a four-layered structure in which first electrode, first separator, second electrode and second separator are sequentially stacked or a repeating structure in which the four-layered structure is repeatedly stacked. Each of the at least two kinds of radical units are stacked by ones to form the four-layered structure or the repeating structure. The separator has a larger size than the electrode to expose an edge part of the separator to outside of the electrode and
(Continued)

the separator. The edge parts of the separators included in one radical unit or in the cell stack part are attached to form a sealing part.

27 Claims, 8 Drawing Sheets

(51) Int. Cl.
    *H01M 10/0585*     (2010.01)
    *H01M 10/052*     (2010.01)

(52) U.S. Cl.
    CPC .... *H01M 10/0585* (2013.01); *H01M 10/0459* (2013.01); *H01M 10/052* (2013.01); *H01M 2220/20* (2013.01); *Y02E 60/122* (2013.01); *Y02P 70/54* (2015.11); *Y10T 29/49108* (2015.01)

(58) Field of Classification Search
    CPC .......... H01M 10/0585; H01M 2220/20; Y10T 29/49108; Y02E 60/122; Y02P 70/54
    See application file for complete search history.

(56) References Cited

U.S. PATENT DOCUMENTS

| | | | |
|---|---|---|---|
| 2002/0160257 A1* | 10/2002 | Lee | H01M 6/46 |
| | | | 429/130 |
| 2002/0160258 A1 | 10/2002 | Lee et al. | |
| 2003/0013012 A1 | 1/2003 | Ahn et al. | |
| 2006/0046149 A1 | 3/2006 | Yong et al. | |
| 2006/0115718 A1 | 6/2006 | Parsian et al. | |
| 2007/0154790 A1* | 7/2007 | Jeung | H01M 2/1094 |
| | | | 429/139 |
| 2007/0254199 A1 | 11/2007 | Shu et al. | |
| 2008/0044689 A1 | 2/2008 | Shu et al. | |
| 2010/0003590 A1* | 1/2010 | Park | H01M 2/1673 |
| | | | 429/144 |
| 2010/0190081 A1 | 7/2010 | Park et al. | |
| 2011/0052964 A1 | 3/2011 | Kim et al. | |
| 2011/0135996 A1 | 6/2011 | Ahn et al. | |
| 2011/0151307 A1 | 6/2011 | Hwang et al. | |
| 2011/0195298 A1 | 8/2011 | Daidoji et al. | |
| 2011/0244304 A1* | 10/2011 | Shinyashiki | H01M 2/16 |
| | | | 429/139 |
| 2011/0281172 A1 | 11/2011 | Yong et al. | |
| 2012/0121964 A1 | 5/2012 | Park et al. | |
| 2012/0135299 A1* | 5/2012 | Kwon | H01M 2/0202 |
| | | | 429/164 |
| 2012/0189894 A1* | 7/2012 | Ahn | H01M 10/0459 |
| | | | 429/135 |
| 2012/0196167 A1 | 8/2012 | Kim et al. | |
| 2012/0225345 A1 | 9/2012 | Kim | |
| 2013/0183570 A1 | 7/2013 | Yong et al. | |
| 2013/0236766 A1 | 9/2013 | Seo et al. | |
| 2014/0134472 A1 | 5/2014 | Kim | |

FOREIGN PATENT DOCUMENTS

| | | |
|---|---|---|
| EP | 2 557 626 A2 | 2/2013 |
| JP | 2001-28275 A | 1/2001 |
| JP | 2001-167743 A | 6/2001 |
| JP | 2009-540523 A | 6/2001 |
| JP | 2002-208442 A | 7/2002 |
| JP | 2003-523060 A | 7/2003 |
| JP | 2011-129523 A | 6/2011 |
| KR | 2001-0082058 A | 8/2001 |
| KR | 2001-0082059 A | 8/2001 |
| KR | 2001-0082060 A | 8/2001 |
| KR | 10-2008-0005629 A | 1/2008 |
| KR | 10-2011-0037781 A | 4/2011 |
| KR | 10-2011-0112241 A | 10/2011 |
| KR | 10-2010-0046091 A | 5/2012 |
| TW | 499767 B | 8/2002 |
| TW | 200743245 A | 11/2007 |
| TW | 200812138 A | 3/2008 |
| TW | I344234 B | 6/2011 |
| WO | WO 2006/025662 A1 | 3/2006 |
| WO | 2008/002024 A1 | 1/2008 |

OTHER PUBLICATIONS

Machine translation of KR 10-2003-0066960, Aug. 14, 2003, Kpion.*
Extended European Search Report, dated Aug. 9, 2016, for corresponding European Application No. 14751378.2.
Partial Supplementary European Search Report, dated Mar. 8, 2016, for corresponding European Application No. 14751378.2.

* cited by examiner

ELECTRODE ASSEMBLY WITH IMPROVED STABILITY AND METHOD OF MANUFACTURING THE SAME

CROSS-REFERENCE TO RELATED APPLICATIONS

This non-provisional application is a Continuation of International Application No. PCT/KR2014/001268 filed on Feb. 17, 2014, which claims priority to Patent Application Nos. 10-2013-0016512 filed in the Republic of Korea on Feb. 15, 2013 and 10-2014-0017701 filed in the Republic of Korea on Feb. 17, 2014. The entire contents of all of the above applications are hereby incorporated by reference.

BACKGROUND OF THE INVENTION

Field of the Invention

The present invention relates to an electrode assembly with improved stability and a method of manufacturing the same, and more particularly, to an electrode assembly with improved stability capable of decreasing shrinkage ratio of a separator and a method of manufacturing the same.

Description of the Related Art

Secondary batteries receive attention as a power source of an electric vehicle (EV), a hybrid electric vehicle (HEV), a parallel hybrid electric vehicle (PHEV), etc., suggested as a means for solving the air pollution of a common gasoline vehicle, a diesel vehicle, etc. using fossil fuel. In a medium and large size device such as a vehicle, high power and high capacity are necessary, and a medium and large size battery module in which a plurality of battery cells are electrically connected is used.

However, since the medium and large size battery module is preferably manufactured to have a small size and light weight, a prismatic type battery, a pouch type battery, etc. having high stacking degree and light weight with respect to capacity have been mainly manufactured as the battery cell of the medium and large size battery module.

In general, an electrode assembly is classified according to the structure of the electrode assembly having a cathode/separator/anode structure, and typically is classified into a jelly-roll type (roll type) electrode assembly having a rolled structure of long sheet type cathodes and anodes with a long sheet type separator disposed therebetween, and a stack-type (laminated type) electrode assembly obtained by stacking a plurality of cathodes and anodes cut into a certain size with a separator therebetween in sequence. Preferably, the structure of the electrode assembly includes a stack-type structure and a stack/folding type structure.

The stack type structure is widely known in the art, and the explanation thereon will be omitted in the present disclosure. Detailed description of an electrode assembly having the stack/folding type structure is disclosed in Korean Patent Application Publication Nos. 2001-0082058, 2001-0082059 and 2001-0082060 filed by the present Applicant.

Figure 1:
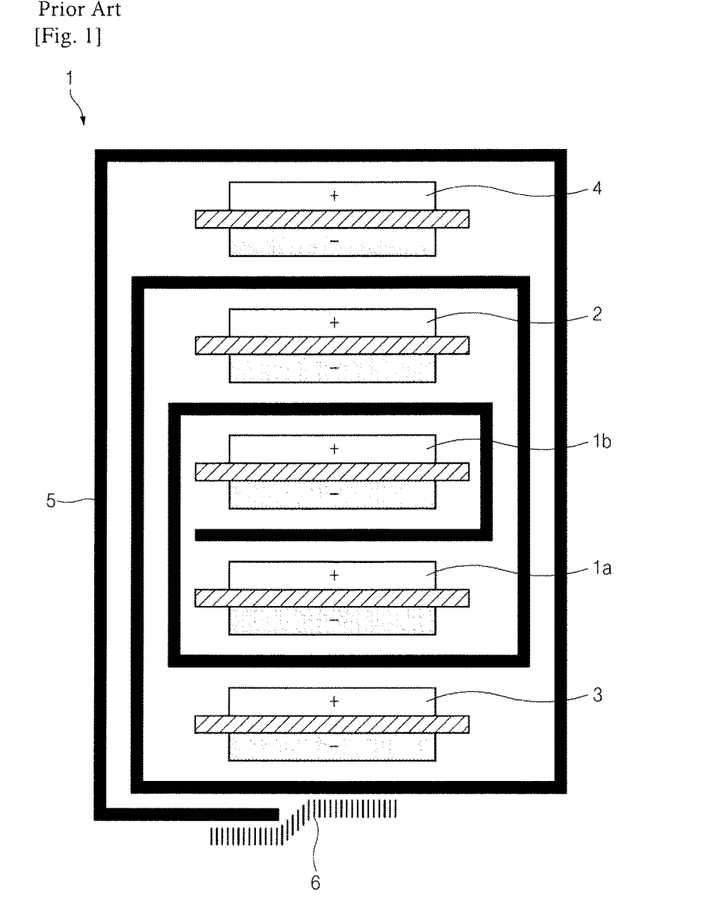
FIG. 1 is a cross-sectional view conceptually illustrating a folding type structure of a common electrode assembly.

Referring to FIG. 1, in an electrode assembly of a stack/folding type structure 1, a plurality of radical units 1a, 1b, 2, 3 and 4, including a cathode, a separator and an anode stacked in sequence are overlapped, and in each of overlapped parts, a separator sheet 5 is interposed. The separator sheet 5 has a length for wrapping the radical units and is disposed at the overlapped parts of the radical units while wrapping each of the radical units from the radical unit 1a to the outermost radical unit 4 continuously.

The terminal part of the separator sheet 5 is finished by heat welding, by attaching using an adhesive tape 6, or the like. The stack/folding type electrode assembly is manufactured by arranging the radical units 1a, 1b, 2, 3 and 4 on the separator sheet 5 having a long length and rolling the separator sheet 5 from one terminal part thereof one by one. However, in this structure, temperature gradient may be generated between the radical units 1a, 1b and 2 positioned in the center portion and the radical units 3 and 4 positioned at the outer portion, thereby generating different heat emitting efficiencies. Thus, lifetime may decrease after use for a long time.

In general, a separator provided in a radical unit is mainly formed by using a polymer material, and has shrinking properties by heat. An overcharge test and a hot box test are performed with respect to an electrode assembly or a secondary battery including the same to evaluate stability. During performing the tests, some bad electrode assemblies or secondary batteries including the same may ignite. The ignition may be generated because of the shrinkage of the separator due to heat and the short generated through the contact of a cathode and an anode.

Meanwhile, even in a commercial secondary battery after performing the test for stability evaluation, a risk of the shrinkage of a separator due to heat applied from the outside during use or heat generated in the secondary battery, and the generation of short as described above is present.

To prevent the above defects, a separator having a larger size than an electrode may be applied in an electrode assembly.

However, in the electrode assembly of a stack/folding type structure 1, the edge parts of a separator are not attached to an electrode, and a series of manufacturing processes of a secondary battery is conducted without conducting specific treatment with respect to the edge parts of the separator. Thus, there is a high risk of generating short due to overcharge, overheat, etc. In addition, since specific treatment with respect to the edge parts of the separator is not conducted in an electrode assembly of a stack type structure, there also is a high risk of generating short as in the electrode assembly of a stack/folding type structure 1.

Thus, both in the electrode assembly of a stack/folding type structure 1 and the electrode assembly of the stack type, the separator is necessary to have a quite large size when compared to the electrodes to definitely prevent the generation of short between the cathode and the anode. In this case, the volume of the secondary battery may increase.

Here, since the separator is more than necessary, the production cost of a secondary battery may increase.

SUMMARY OF THE INVENTION

An aspect of the present disclosure for solving the above-described defects provides an electrode assembly having decreased risk of inner short and improved stability even though using a separator having the same as or a somewhat smaller size of that of a common separator, and a method of manufacturing the same.

Another aspect of the present invention is to provide an electrode assembly having decreased unit production cost and having improved stability, and a manufacturing method thereof.

A further aspect of the present invention is to provide an electrode assembly with improved stability and a manufacturing method thereof by which the electrode assembly may be manufactured only using one kind of bi-cells.

According to an aspect of the present disclosure, there is provided an electrode assembly with improved stability including a cell stack part having (a) a structure in which one kind of radical unit is repeatedly disposed, the one kind of radical unit having a same number of electrodes and separators which are alternately disposed and integrally combined, or (b) a structure in which at least two kinds of radical units are disposed in a predetermined order, the two kinds of radical units having a same number of electrodes and separators which are alternately disposed and integrally combined. The one kind of radical unit of (a) has a four-layered structure in which a first electrode, a first separator, a second electrode and a second separator are sequentially stacked together or a repeating structure in which the four-layered structure is repeatedly stacked, and each of the at least two kinds of radical units of (b) are stacked by ones in the predetermined order to form the four-layered structure or the repeating structure in which the four-layered structure is repeatedly stacked. The separator has a larger size than the electrode to expose an edge part of the separator to the outside of the electrode and the separator. The edge parts of the separators included in one radical unit are attached to each other to form a sealing part, or the edge parts of the separators included in the cell stack part are attached to each other to form the sealing part.

According to another aspect of the present disclosure, there is provided a method of manufacturing an electrode assembly with improved stability including a step of forming one kind of a radical unit having an alternately stacked structure of a same number of electrodes and separators, or at least two kinds of radical units having an alternately stacked structure of a same number of electrodes and separators (S10); a step of forming a sealing part by facing edge parts of the separators included in one radical unit and applying heat and pressure (S20); and a step of forming a cell stack part by repeatedly stacking the one kind of the radical units after performing steps S10 and S20, or by stacking the at least two kinds of the radical units after performing steps S10 and S20 in a predetermined order (S22). The one kind of radical unit has a four-layered structure in which a first electrode, a first separator, a second electrode and a second separator are sequentially stacked together or a repeating structure in which the four-layered structure is repeatedly stacked, and each of the at least two kinds of radical units are stacked by ones in the predetermined order to form the four-layered structure or the repeating structure in which the four-layered structure is repeatedly stacked.

According to further another aspect of the present disclosure, there is provided a method of manufacturing an electrode assembly with improved stability including a step of forming one kind of a radical unit having an alternately stacked structure of a same number of electrodes and separators, or at least two kinds of radical units having an alternately stacked structure of a same number of electrodes and separators (S10); a step of forming a cell stack part by repeatedly stacking the one kind of the radical units, or by stacking the at least two kinds of the radical units in a predetermined order (S14); and a step of forming a sealing part by facing edge parts of the separators included in the cell stack part and applying heat and pressure (S30). The one kind of radical unit has a four-layered structure in which a first electrode, a first separator, a second electrode and a second separator are sequentially stacked together or a repeating structure in which the four-layered structure is repeatedly stacked, and each of the at least two kinds of radical units are stacked by ones in the predetermined order to form the four-layered structure or the repeating structure in which the four-layered structure is repeatedly stacked.

According to the present invention, the following effects may be obtained.

First, an electrode assembly having decreased risk of inner short and improved stability even though using a separator having the same as or a somewhat smaller size of that of a common separator, and a method of manufacturing the same, may be provided.

Second, an electrode assembly having decreased production cost and having improved stability and a method of manufacturing the same, may be provided.

Third, an electrode assembly having improved stability and a method of manufacturing the same by which the electrode assembly may be manufactured only using one kind of bi-cells, may be provided.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of an electrode assembly with improved stability and a method of manufacturing the same according to the present disclosure will now be described in detail with reference to the accompanying drawings.

It will be understood that terms, such as those defined in commonly used dictionaries, should be interpreted as having a meaning that is consistent with their meaning in the context of the relevant art and will not be interpreted in an idealized or overly formal sense unless expressly so defined herein. Rather, these embodiments are provided so that this disclosure will be thorough and complete, and will fully convey the scope of the inventive concept to those skilled in the art. Although the preferred embodiments of the present disclosure have been disclosed for illustrative purpose, those skilled in the art will appreciate that various modifications, additions and substitutions can be made without departing from the scope and spirit of the inventive concept as defined in the accompanying claims.

In the drawings, the sizes and relative sizes of each elements or a specific part composing the elements may be exaggerated or briefly illustrated for effective explanation and clearance of technical contents. Thus a real size is not reflected to the size of each element. Particular explanation on relevant known functions or constituents is considered to unnecessarily confuse the gist of the present disclosure, the explanation will be omitted.

An electrode assembly according to the present disclosure includes a cell stack part having a structure obtained by stacking radical units repeatedly or in a predetermined order, or having a structure obtained by further stacking an auxiliary unit on the cell stack part. In addition, a sealing part may be formed by attaching the edge parts of separators having a larger size than electrodes by the radical unit, or a sealing part may be formed by attaching the edge parts of all separators present in the cell stack part having a structure obtained by stacking radical units repeatedly or in a predetermined order at the same time.

The structure of the radical unit and the auxiliary unit possibly stacked on the radical unit, and the structure of the cell stack part having a plurality of stacked radical units may be attained diversely. Therefore, these structures will be explained first, and the formation of the sealing part in the radical unit or the formation of the sealing part in the cell stack part at the same time will be subsequently explained.

Cell Stack Part

The cell stack part has a structure obtained by repeatedly disposing one kind of radical units or a structure obtained by disposing at least two kinds of radical units in a predetermined order, for example, alternately. This will be described below in more detail.

[Structure of Radical Unit]

Figure 2:
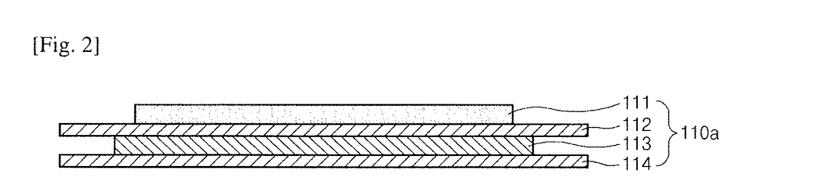
FIG. 2 is a side view illustrating a first structure of a radical unit according to the present disclosure.

In an electrode assembly according to the present disclosure, a radical unit is formed by alternately disposing electrodes and separators. Here, the same number of electrodes and separators are disposed. For example, as illustrated in FIG. 2 a radical unit 110a may be formed by stacking two electrodes 111 and 113 and two separators 112 and 114. Here, a cathode and an anode may naturally face each other through the separator. When the radical unit is formed as described above, an electrode 111 is positioned at one end part of the radical unit (see electrode 111 in FIGS. 2 and 2) and a separator 114 is positioned at the other end part of the radical unit (see separator 114 in FIGS. 2 and 2).

The electrode assembly according to the present disclosure is basically characterized in that the cell stack part or electrode assembly is formed by only stacking the radical units. That is, the present disclosure has a basic characteristic in that the cell stack part is formed by repeatedly stacking one kind of radical unit or by stacking at least two kinds of radical units in a predetermined order. To realize the above-described characteristic, the radical unit may have the following structure.

Figure 3:
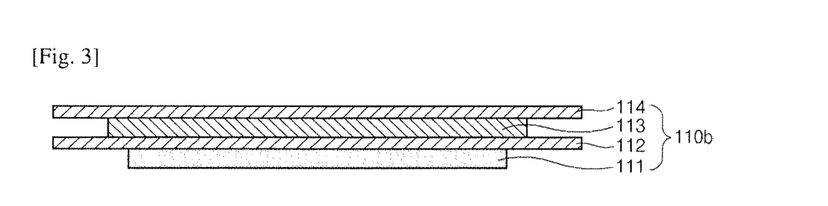
FIG. 3 is a side view illustrating a second structure of a radical unit according to the present disclosure.

First, the radical unit may be formed by stacking a first electrode, a first separator, a second electrode, and a second separator in sequence. In more detail, a first electrode 111, a first separator 112, a second electrode 113, and a second separator 114 may be stacked in sequence from an upper side to a lower side, as illustrated in FIG. 2, or from the lower side to the upper side, as illustrated in FIG. 3, to form radical units 110a and 110b. The radical unit having the above-described structure may be referred to as a first radical unit. Here, the first electrode 111 and the second electrode 113 may be opposite types of electrodes. For example, when the first electrode 111 is a cathode, the second electrode 113 may be an anode.

Figures 4, 5:
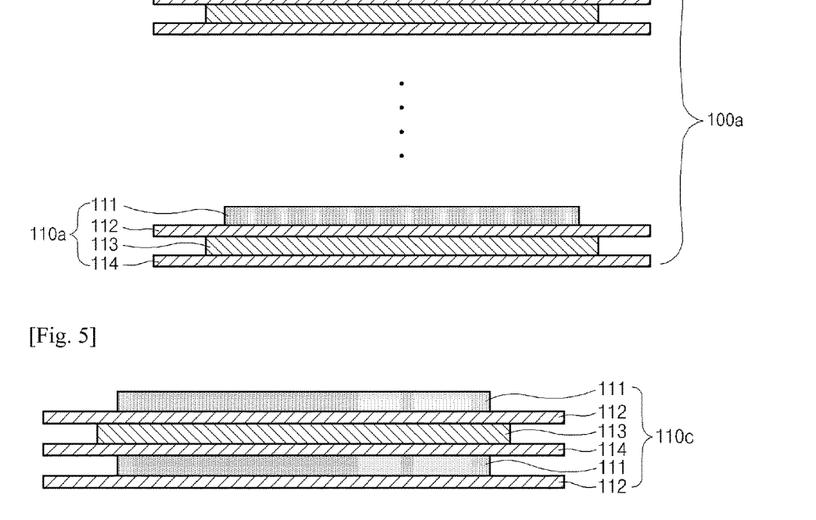
FIG. 4 is a side view illustrating a cell stack part formed by stacking the radical units of FIG. 2.
FIG. 5 is a side view illustrating a third structure of a radical unit according to the present disclosure.

As described above, when the radical unit is formed by stacking the first electrode 111, the first separator 112, the second electrode 113, and the second separator 114 in sequence, a cell stack part 100a may be formed by only repeatedly stacking the one kind of radical units 110a, as illustrated in FIG. 4. Here, the radical unit may have an eight-layered structure or twelve-layered structure in addition to a four-layered structure. That is, the radical unit may have a repeating structure in which the four-layered structure is repeatedly disposed. For example, the radical unit may be formed by stacking the first electrode 111, the first separator 112, the second electrode 113, the second separator 114, the first electrode 111, the first separator 112, the second electrode 113, and the second separator 114 in sequence.

Alternatively, the radical unit may be formed by stacking the first electrode 111, the first separator 112, the second electrode 113, the second separator 114, the first electrode 111, and the first separator 112 in sequence, or by stacking the second electrode 113, the second separator 114, the first electrode 111, the first separator 112, the second electrode 113, and the second separator 114 in sequence. The radical unit having the former structure may be referred to as a second radical unit and the radical unit having the latter structure may be referred to as a third radical unit.

Figure 6:
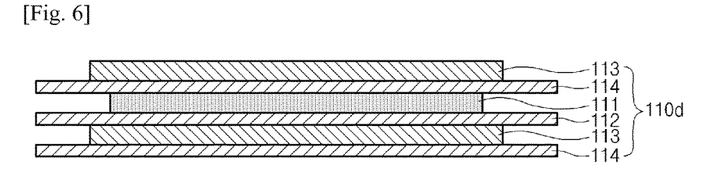
FIG. 6 is a side view illustrating a fourth structure of a radical unit according to the present disclosure.

In more detail, the second radical unit 100c may be formed by stacking the first electrode 111, the first separator 112, the second electrode 113, the second separator 114, the first electrode 111, and the first separator 112 in sequence from the upper side to the lower side, as illustrated in FIG. 5. Also, the third radical structure 110d may be formed by stacking the second electrode 113, the second separator 114, the first electrode 111, the first separator 112, the second electrode 113, and the second separator 114 in sequence from the upper side to the lower side, as illustrated in FIG. 6. As noted above, the stacking may be conducted in sequence from the lower side to the upper side.

Figure 7:
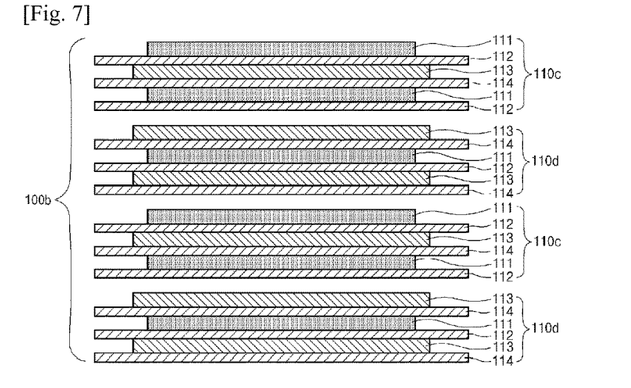
FIG. 7 is a side view illustrating a cell stack part formed by stacking the radical units of FIG. 5 and the radical units of FIG. 6.

When only one of the second radical units 110c and one of the third radical units 110d are stacked, a repeating structure in which the four-layered structure is repeatedly stacked may be formed. Thus, when the second radical unit 110c and the third radical unit 110d are alternately stacked one by one, the cell stack part 100b may be formed by stacking only the second and third radical units, as illustrated in FIG. 7. For reference, when three kinds of radical units are prepared, the cell stack part may be formed by stacking the radical units in a predetermined order, for example, the first radical unit, the second radical unit, the third radical unit, the first radical unit again, the second radical unit, and the third radical unit.

As described above, the one kind of radical unit in the present disclosure has a four-layered structure in which a first electrode, a first separator, a second electrode and a second separator are sequentially stacked, or has a repeating structure in which the four-layered structure is repeatedly stacked. Also, at least two kinds of radical units in the present disclosure are stacked only by ones in a predetermined order to form the four-layered structure or the repeating structure in which the four-layered structure is repeatedly disposed. For example, the first radical unit forms a four-layered structure by itself, and the second radical unit and the third radical unit form a twelve-layered structure by stacking one of each, that is, two radical units in total.

Thus, the cell stack part or electrode assembly may be formed only by stacking, that is, by repeatedly stacking one kind of radical unit or by stacking at least two kinds of radical units in a predetermined order.

The cell stack part of the present disclosure may be formed by stacking the radical units one by one. That is, the cell stack part may be manufactured by forming the radical units and then stacking the radical units repeatedly or in a predetermined order. As described above, the cell stack part of the present disclosure may be formed by only stacking the radical units. Therefore, the radical units of the present disclosure may be very accurately aligned. When the radical unit is accurately aligned, the electrode and the separator may also be accurately aligned in the cell stack part. In addition, the cell stack part or electrode assembly may be improved in productivity. This is done because the manufacturing process is very simple.

[Manufacture of Radical Unit]

Figure 8:
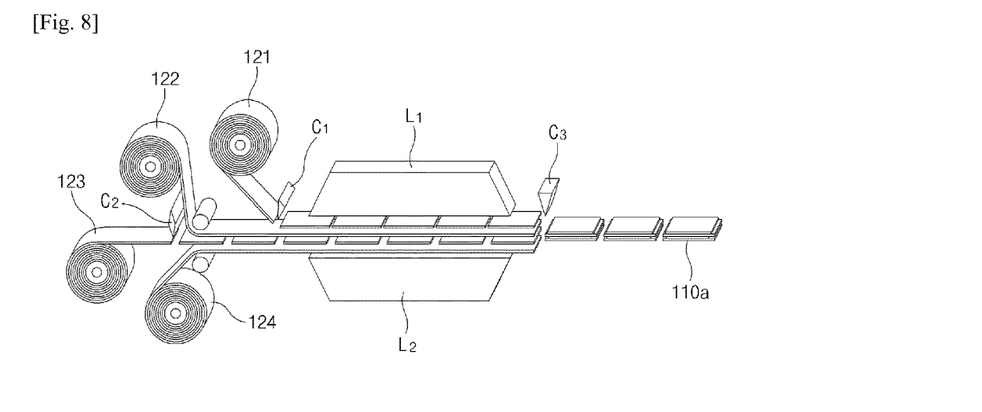
FIG. 8 is a process diagram illustrating a manufacturing process of a radical unit according to the present disclosure.

A manufacturing process of the first radical unit will be exemplarily described with reference to FIG. 8. First, a first electrode material 121, a first separator material 122, a second electrode material 123 and a second separator material 124 are prepared. Here, the first separator material 122 and the second separator material 124 may be the same. The first electrode material 121 is cut into a certain size through a cutter C1, and the second electrode material 123 is cut into a certain size through a cutter C2. Then, the first electrode material 121 is stacked on the first separator material 122, and the second electrode material 123 is stacked on the second separator material 124.

Then, it is preferable that the electrode materials and the separator materials are attached to each other through laminators L1 and L2. Through the attachment, a radical unit in which the electrodes and the separators are integrally combined may be formed. The combining method may be diverse. The laminators L1 and L2 may apply pressure to the materials or apply pressure and heat to the materials to attach the materials to each other. Because of the attachment, the stacking of the radical units may be more easily performed while manufacturing the cell stack part. Also, the alignment of the radical units may be also easily accomplished because of the attachment. After the attachment, the first separator material 122 and the second separator material 124 are cut into a certain size through a cutter C3 to manufacture the radical unit 110a.

As described above, the electrode may be attached to the adjacent separator in the radical unit. Alternatively, the separator may be attached to the adjacent electrode. Here, it is preferable that an entire surface of the electrode facing the adjacent separator is attached to the adjacent separator. In this case, the electrode may be stably fixed to the separator. Typically, the electrode has a size less than that of the separator.

For this, an adhesive may be applied to the separator. However, when the adhesive is used, it is necessary to apply the adhesive over an adhesion surface of the separator in a mesh or dot shape. This is because if the adhesive is closely applied to the entire adhesion surface, reactive ions such as lithium ions may not pass through the separator. Thus, when the adhesive is used, it is difficult to allow the overall surface of the electrode to closely attach to the adjacent separator.

Alternatively, use of the separator including the coating layer having adhesive strength makes it possible to generally attach the electrode to the separator. This will be described below in more detail. The separator may include a porous separator base material such as a polyolefin-based separator base material and a porous coating layer that is generally applied to one side or both sides of the separator base material. Here, the coating layer may be formed of a mixture of inorganic particles and a binder polymer that binds and fixes the inorganic particles to each other.

Here, the inorganic particles may improve thermal stability of the separator. That is, the inorganic particles may prevent the separator from being contracted at a high temperature. In addition, the binder polymer may fix the inorganic particles to improve mechanical stability of the separator. Also, the binder polymer may attach the electrode to the separator. Since the binder polymer is generally distributed in the coating layer, the electrode may closely adhere to the entire adhesion surface of the separator, unlike the foregoing adhesive. Thus, when the separator is used as described above, the electrode may be more stably fixed to the separator. To enhance the adhesion, the above-described laminators may be used.

The inorganic particles may have a densely packed structure to form interstitial volumes between the inorganic particles over the overall coating layer. Here, a pore structure may be formed in the coating layer by the interstitial volumes that are defined by the inorganic particles. Due to the pore structure, even though the coating layer is formed on the separator, the lithium ions may smoothly pass through the separator. For reference, the interstitial volume defined by the inorganic particles may be blocked by the binder polymer according to a position thereof.

Here, the densely packed structure may be explained as a structure in which gravels are contained in a glass bottle. Thus, when the inorganic particles form the densely packed structure, the interstitial volumes between the inorganic particles are not locally formed in the coating layer, but generally formed in the coating layer. As a result, when each of the inorganic particles increases in size, the pore formed by the interstitial volume also increases in size. Due the above-described densely packed structure, the lithium ions may smoothly pass through the separator over the entire surface of the separator.

The radical units may also adhere to each other in the cell stack part. For example, if the adhesive or the above-described coating layer is applied to a bottom surface of the second separator 114 in FIG. 2, the other radical unit may adhere to the bottom surface of the second separator 114.

Here, the adhesive strength between the electrode and the separator in the radical unit may be greater than that between the radical units in the cell stack part. It is understood, that the adhesive strength between the radical units may not be provided. In this case, when the electrode assembly or the cell stack part is disassembled, the electrode assembly may be separated into the radical units due to a difference in the adhesive strength. For reference, the adhesive strength may be expressed as delamination strength. For example, the adhesive strength between the electrode and the separator may be expressed as a force required for separating the electrode from the separator. In this manner, the radical unit may not be bonded to the adjacent radical unit in the cell stack part, or may be bonded to the adjacent radical unit in the cell stack part by means of a bonding strength differing from a bonding strength between the electrode and the separator.

For reference, when the separator includes the above-described coating layer, it is not preferable to perform ultrasonic welding on the separator. Typically, the separator has a size greater than that of the electrode. Thus, there may be an attempt to bond the edge of the first separator 112 to the edge of the second separator 114 through the ultrasonic welding. Here, it is necessary to directly press an object to be welded through a horn in the ultrasonic welding. However, when the edge of the separator is directly pressed through the horn, the separator may adhere to the horn due to the coating layer having the adhesive strength. As a result, the welding apparatus may be broken down.

[Modification of Radical Unit]

Until now, the radical units having the same size have been explained. However, the radical units may have different sizes. When stacking the radical units having different sizes, cell stack parts having various shapes may be manufactured. Herein, the size of the radical unit is explained with reference to the size of the separator, because, typically, the separator is larger than the electrode.

Figure 9:
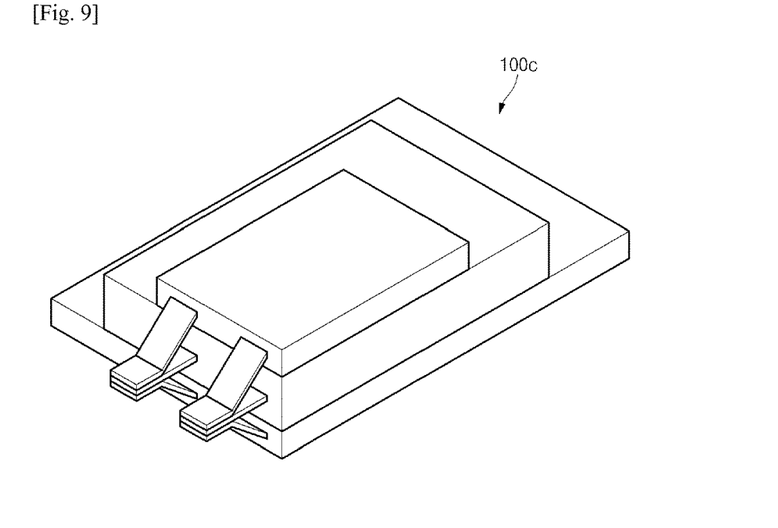
FIG. 9 is a perspective view illustrating a cell stack part formed by stacking radical units having different sizes.
Figure 10:
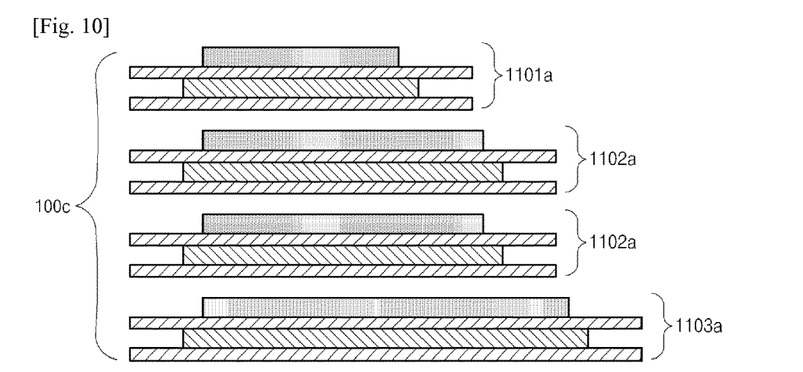
FIG. 10 is a side view illustrating the cell stack part of FIG. 9.

Referring to FIGS. 9 and 10, a plurality of radical units is prepared and may be classified into at least two groups having different sizes (see reference numerals 1101a, 1102a and 1103a in FIG. 10). By stacking the radical units according to their sizes, a cell stack part 100c having a structure of a plurality of steps may be formed. FIGS. 9 and 10 illustrate an embodiment in which the cell stack part includes three steps obtained by stacking the radical units 1101a, 1102a and 1103a classified into three groups, in which the radical units having the same size are stacked together, is illustrated. For reference, the radical units included in one group may form two or more steps.

When the plurality of steps is formed as described above, it is preferable that the radical unit has a structure of the first radical unit, that is, the above-described four-layered structure or the repeating structure in which the four-layered structure is repeatedly stacked. (Herein, the radical units are considered to be included in one kind of radical unit even though the radical units have the same stacked structures but have different sizes.)

Preferably, the same number of cathodes and the anodes are stacked in one step. Also, it is preferable that opposite electrodes face each other through a separator between one step and another step. For example, in case of the second and third radical units, two kinds of the radical units are necessary for forming one step.

However, in case of the first radical unit, only one kind of radical unit is necessary for forming one step as illustrated in FIG. 10. Thus, when the radical unit has the four-layered structure or the repeating structure in which the four-layered structure is repeatedly stacked, number of kinds of radical units may decrease even though a plurality of the steps is formed.

Also, in case of the second and the third radical units, at least one of the two kinds of the radical units are necessary to be stacked to form one step. Thus, the one step may have at least a twelve-layered structure. However, in case of the first radical unit, only one kind of radical unit is necessary to be stacked to form one step. Thus, one step may have at least a four-layered structure. As a result, when the radical unit has the four-layered structure or the repeating structure in which the four-layered structure is repeatedly stacked, the thickness of each step may be easily controlled when forming a plurality of steps.

Figure 11:
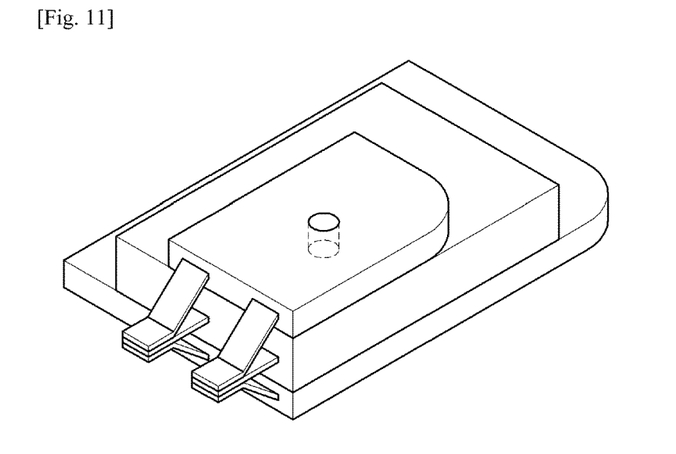
FIG. 11 is a perspective view illustrating a cell stack part formed by stacking radical units having different geometric shapes.

The radical units may have not only different sizes but also different geometric shapes. For example, the radical units may have different sizes and different edge shapes, and may or may not have a through hole as illustrated in FIG. 11. More particularly, as illustrated in FIG. 11, a plurality of radical units classified into three groups may form three steps by stacking the radical units having the same geometric shapes. For this, the radical units may be classified into at least two groups (each of the groups has different geometric shape). Similarly, the radical unit may preferably have the four-layered structure or the repeating structure in which the four-layered structures are repeatedly stacked, that is, the structure of the first radical unit. (Herein, the radical units are considered to be included in one kind of radical unit even though the radical units have the same stacked structure but have different geometric shapes.)

[Auxiliary Unit]

The cell stack part may further include at least one among a first auxiliary unit and a second auxiliary unit. First, the first auxiliary unit will be described below. In the present disclosure, an electrode is positioned at one end of the radical unit, and a separator is positioned at the other end of the radical unit. When the radical units are stacked in sequence, the electrode may be positioned at the uppermost portion or at the lowermost portion of the cell stack part (see reference numeral 116 in FIG. 12, and this electrode may be referred to as a terminal electrode 116). The first auxiliary unit is additionally stacked on the terminal electrode.

Figure 12:
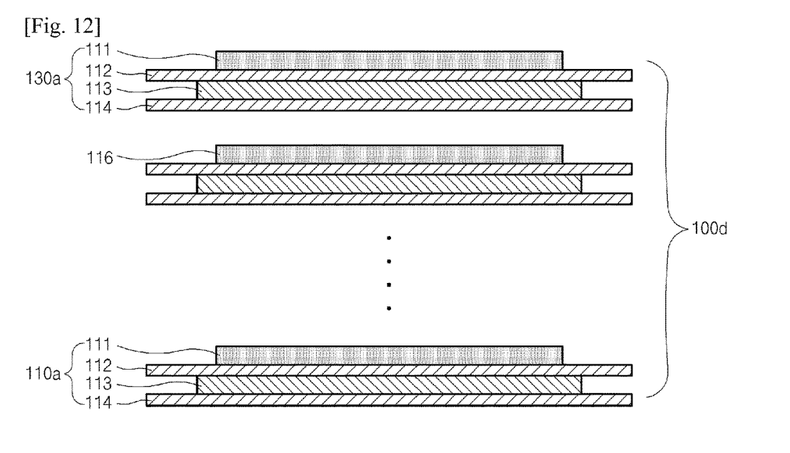
FIG. 12 is a side view illustrating a first structure of a cell stack part including a radical unit and a first auxiliary unit according to the present disclosure.

In more detail, when the terminal electrode 116 is a cathode, the first auxiliary unit 130a may be formed by stacking outward from the terminal electrode 116, a separator 114, an anode 113, a separator 112, and a cathode 111 in sequence, as illustrated in FIG. 12. On the other hand, when the terminal electrode 116 is an anode, the first auxiliary unit 130b may be formed by stacking outward from the terminal electrode 116, the separator 114, and the cathode 113 in sequence, as illustrated in FIG. 13.

Figure 13:
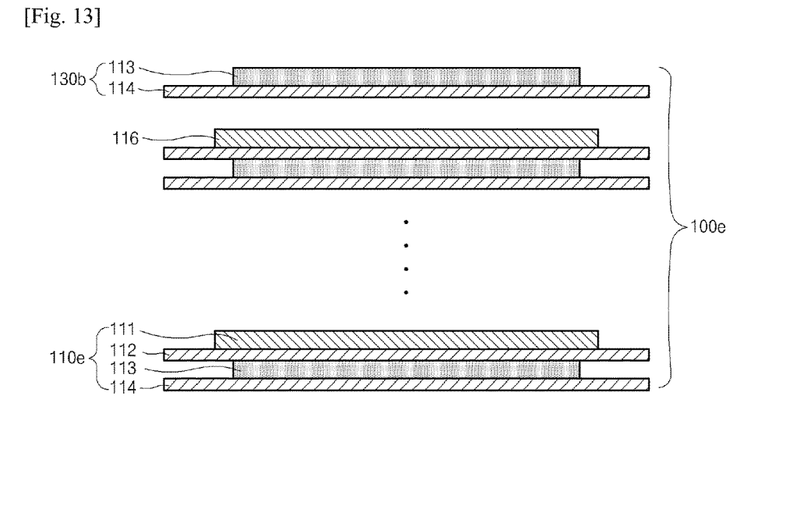
FIG. 13 is a side view illustrating a second structure of a cell stack part including a radical unit and a first auxiliary unit according to the present disclosure.

In the cell stack parts 100d and 100e, a cathode may be positioned at the outermost portion of a terminal electrode through the first auxiliary units 130a and 130b, as illustrated in FIGS. 12 and 13. In this case, in the cathode positioned at the outermost portion, that is, the cathode of the first auxiliary unit, an active material layer is preferably coated on only one side facing the radical unit (one side facing downward in FIG. 12) among both sides of the current collector. When the one side of the current collector is coated with the active material layer as described above, the active material layer is not positioned at the outermost portion of the cell stack part. Thus, waste of the active material layer may be prevented. For reference, since the cathode emits, for example, lithium ions, when the cathode is positioned at the outermost portion, the capacity of a battery may be improved.

Next, a second auxiliary unit will be described below. The second auxiliary unit performs the same function as the first auxiliary unit, which will be described below in more detail. In the present disclosure, an electrode is positioned at one end of the radical unit, and a separator is positioned at the other end of the radical unit. When the radical units are stacked in sequence, the separator may be positioned at the uppermost portion or at the lowermost portion of the cell stack part (see reference numeral 117 in FIG. 14, and this separator may be referred to as a terminal separator 117). The second auxiliary unit is additionally stacked on the terminal separator.

Figure 14:
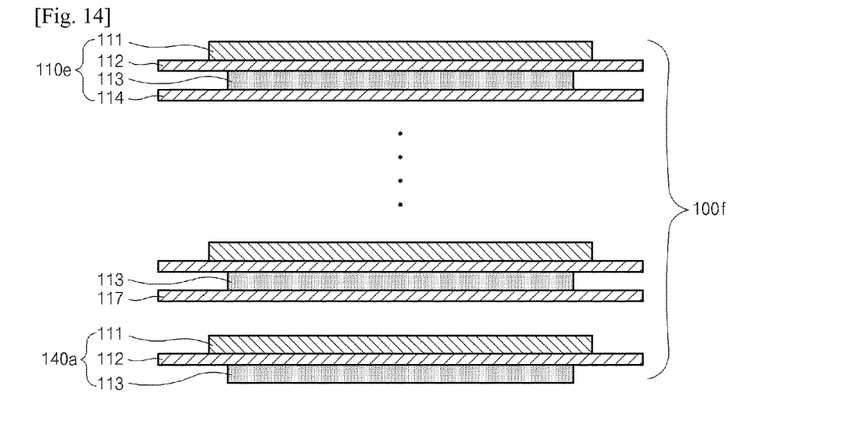
FIG. 14 is a side view illustrating a third structure of a cell stack part including a radical unit and a second auxiliary unit according to the present disclosure.

In more detail, when the electrode 113 contacting the terminal separator 117 is a cathode in the radical unit, the second auxiliary unit 140a may be formed by stacking from the terminal separator 117, an anode 111, a separator 112, and a cathode 113 in sequence, as illustrated in FIG. 14. On the other hand, when the electrode 113 contacting the terminal separator 117 is an anode in the radical unit, the second auxiliary unit 140b may be formed as the cathode 111, as illustrated in FIG. 15.

Figure 15:
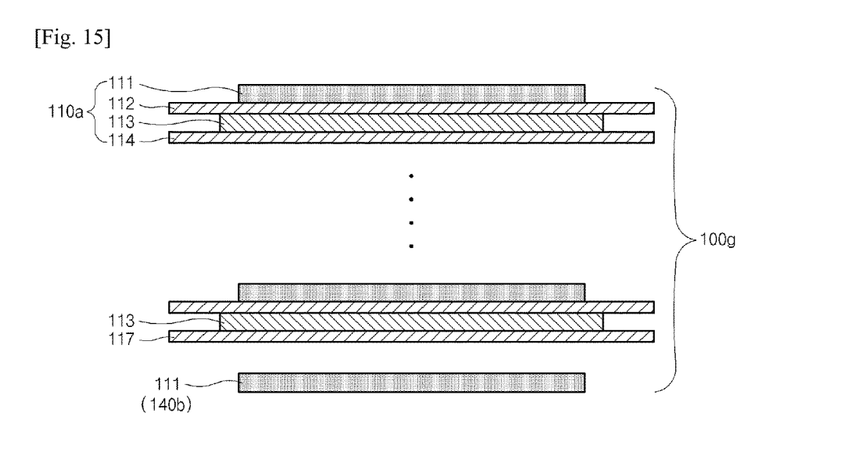
FIG. 15 is a side view illustrating a fourth structure of a cell stack part including a radical unit and a second auxiliary unit according to the present disclosure.

In the cell stack parts 100f and 100g, a cathode may be positioned at the outermost portion of a terminal separator through the second auxiliary units 140a and 140b, as illustrated in FIGS. 14 and 15. In this case, in the cathode positioned at the outermost portion, that is, the cathode of the second auxiliary unit, an active material layer is preferably coated on only one side facing the radical unit (one side facing upward in FIG. 14) among both sides of the current collector, as similar to the cathode of the first auxiliary unit.

Figure 16:
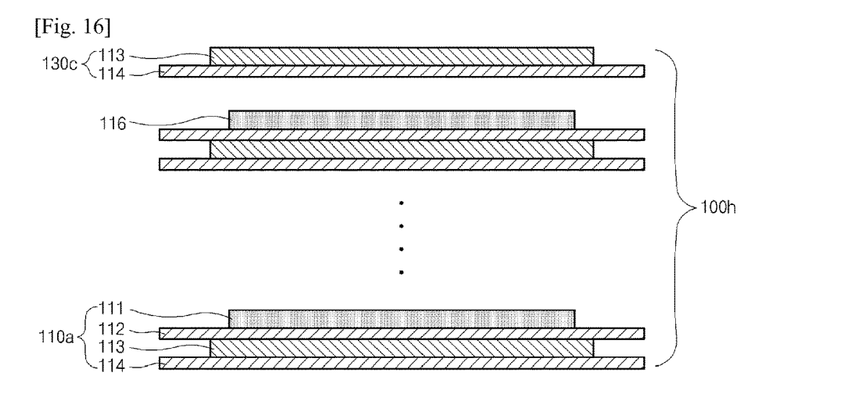
FIG. 16 is a side view illustrating a fifth structure of a cell stack part including a radical unit and a first auxiliary unit according to the present disclosure.

The first auxiliary unit and the second auxiliary unit may have different structures from those described above. First, the first auxiliary unit will be described below. When the terminal electrode 116 is a cathode as illustrated in FIG. 16, the first auxiliary unit 130c may be formed by stacking from the terminal electrode 116, a separator 114, and an anode 113 in sequence. On the other hand, when the terminal electrode 116 is an anode as illustrated in FIG. 17, the first auxiliary unit 130d may be formed by stacking from the terminal electrode 116, a separator 114, a cathode 113, a separator 112, and an anode 111 in sequence.

Figures 17, 18:
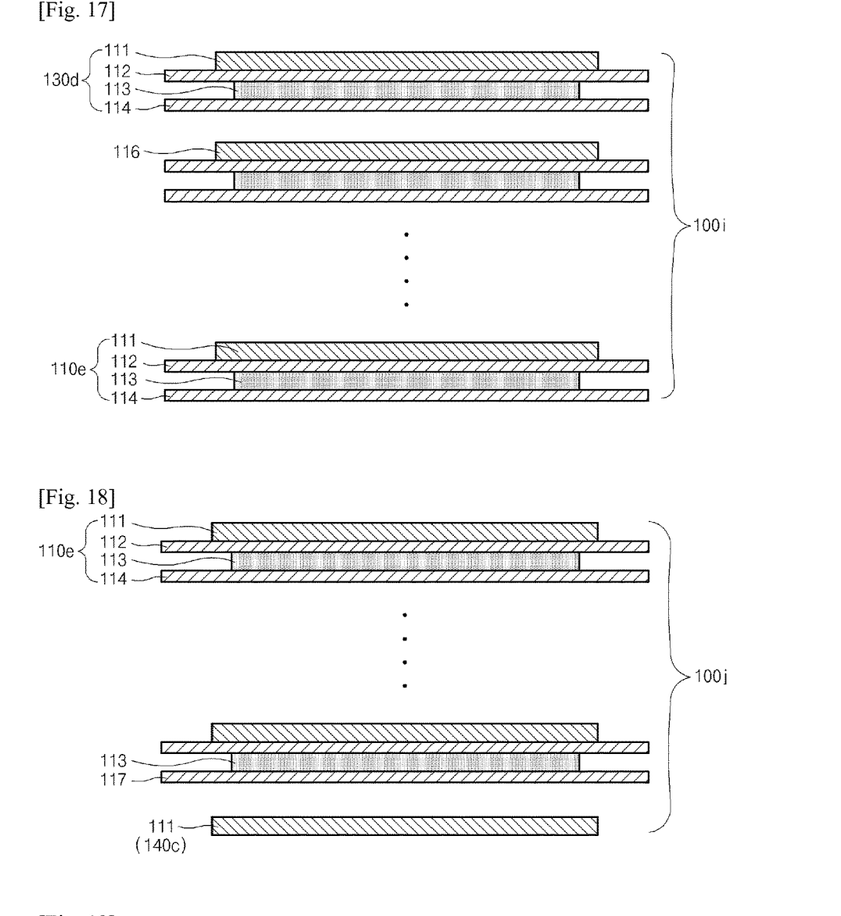
FIG. 17 is a side view illustrating a sixth structure of a cell stack part including a radical unit and a first auxiliary unit according to the present disclosure.
FIG. 18 is a side view illustrating a seventh structure of a cell stack part including a radical unit and a second auxiliary unit according to the present disclosure.

In the cell stack parts 100h and 100i, an anode may be positioned at the outermost portion of the terminal electrode through the first auxiliary units 130c and 130d, as illustrated in FIGS. 16 and 17.

Figure 19:
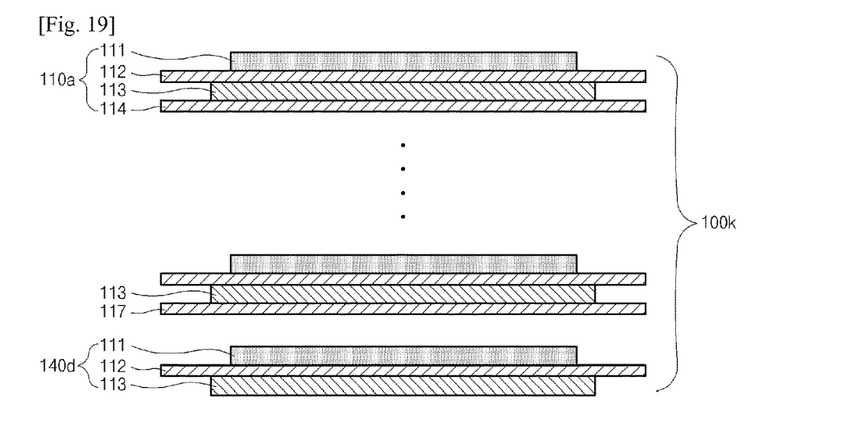
FIG. 19 is a side view illustrating an eighth structure of a cell stack part including a radical unit and a second auxiliary unit according to the present disclosure.

Next, the second auxiliary unit will be described below. As illustrated in FIG. 18, when the electrode 113 contacting the terminal separator 117 is a cathode in the radical unit, the second auxiliary unit 140c may be formed as an anode 111. As illustrated in FIG. 19, when the electrode 113 contacting the terminal separator 117 is an anode in the radical unit, the second auxiliary unit 140d may be formed by stacking from the terminal separator 117, the cathode 111, the separator 112, and the anode 113 in sequence. In the cell stack parts 100j and 100k, an anode may be positioned at the outermost portion of the terminal separator through the second auxiliary units 140c and 140d, as illustrated in FIGS. 18 and 19.

Figure 20:
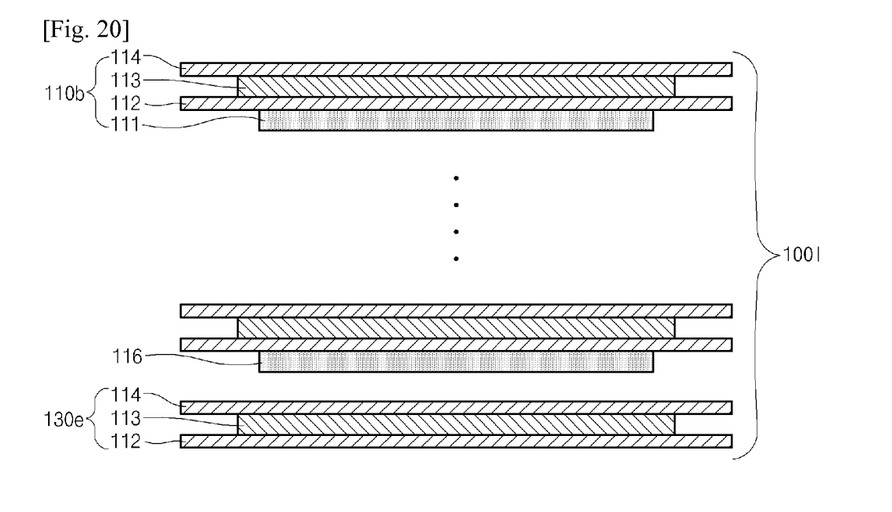
FIG. 20 is a side view illustrating a ninth structure of a cell stack part including a radical unit and a first auxiliary unit according to the present disclosure.

For reference, an anode may make a reaction with an aluminum layer of a battery case (for example, a pouch-type case) due to potential difference. Thus, the anode is preferably insulated from the battery case by means of a separator. For this, the first and second auxiliary units in FIGS. 16 to 19 may further include a separator at the outer portion of the anode. For example, the first auxiliary unit 130e in FIG. 20 may further include a separator 112 at the outermost portion thereof when compared to the first auxiliary unit 130c in FIG. 16. For reference, when the auxiliary unit includes the separator, the alignment of the auxiliary units in the radical unit may be easily performed.

Figure 21:
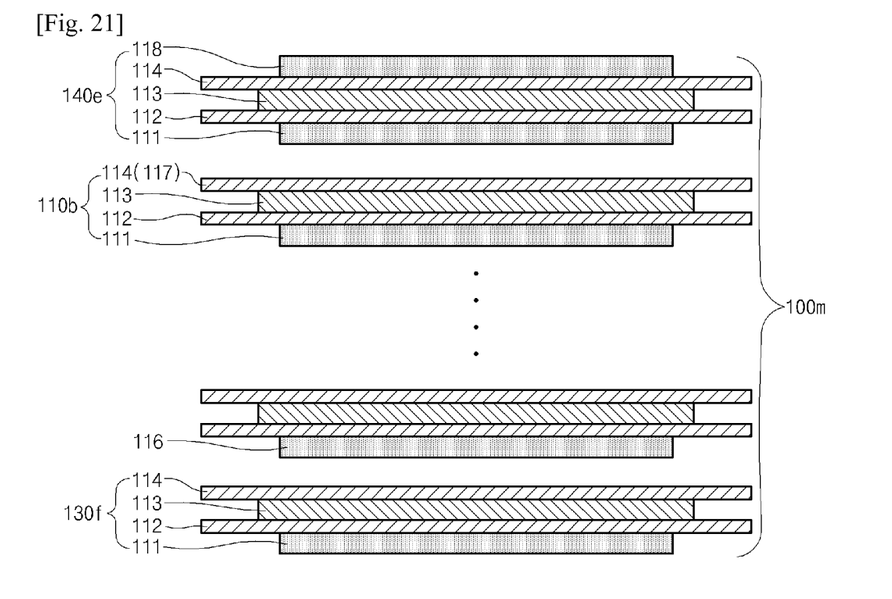
FIG. 21 is a side view illustrating a tenth structure of a cell stack part including a radical unit, a first auxiliary unit, and a second auxiliary unit according to the present disclosure.

A cell stack part 100m may be formed as illustrated in FIG. 21. A radical unit 110b may be formed by stacking from the lower portion to the upper portion, a first electrode 111, a first separator 112, a second electrode 113, and a second separator 114 in sequence. In this case, the first electrode 111 may be a cathode, and the second electrode 113 may be an anode.

A first auxiliary unit 130f may be formed by stacking from the terminal electrode 116, the separator 114, the anode 113, the separator 112 and the cathode 111 in sequence. In this case, in the cathode 111 of the first auxiliary unit 130f, only one side of a current collector facing the radical unit 110b among both sides of the current collector may be coated with an active material layer.

Also, a second auxiliary unit 140e may be formed by stacking from the terminal separator 117, the cathode 111 (the first cathode), the separator 112, the anode 113, the separator 114, and the cathode 118 (the second cathode) in sequence. In this case, in the cathode 118 (the second cathode) of the second auxiliary unit 140e positioned at the outermost portion, only one side of a current collector facing the radical unit 110b among both sides of the current collector may be coated with an active material layer.

Figure 22:
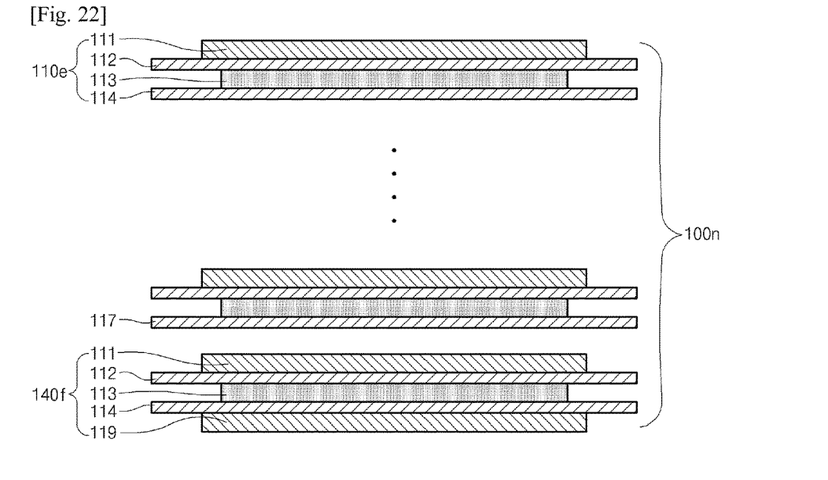
FIG. 22 is a side view illustrating an eleventh structure of a cell stack part including a radical unit and a second auxiliary unit according to the present disclosure.

Finally, a cell stack part 100n may be formed as illustrated in FIG. 22. A radical unit 110e may be formed by stacking from the upper portion to the lower portion, a first electrode 111, a first separator 112, a second electrode 113, and a second separator 114 in sequence. In this case, the first electrode 111 may be an anode, and the second electrode 113 may be a cathode. Also, a second auxiliary unit 140f may be formed by stacking from the terminal separator 117, the anode 111, the separator 112, the cathode 113, the separator 114, and the anode 119 in sequence.

Until now, the structure of the radical unit, the structure of the auxiliary unit that may be stacked on the radical unit, and the structure of the cell stack part having the plurality of stacked radical units have been explained. Hereinafter, the manufacturing of the cell stack part (electrode assembly) by forming a sealing part A at the radical unit itself or by forming a sealing part A at the cell stack part at the same time will be explained referring to the first radical unit illustrated in FIG. 2 for convenience.

The electrode assembly may correspond to the cell stack part itself or the cell stack part wrapped in a tape for fixing. Thus, the electrode assembly according to the present disclosure is provided with a cell stack part having a repeatedly stacked structure of one kind of the radical units including the same number of alternately stacked electrodes and separators, or having a stacked structure of two or more kinds of the radical units including the same number of alternately stacked electrodes and separators in a predetermined order.

Figure 23:
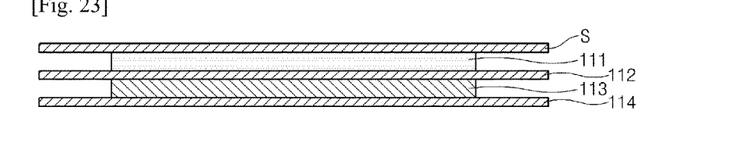
FIG. 23 is a cross-sectional view illustrating a stacked state of a separator on the first structure of the radical unit in FIG. 2.
Figure 24:
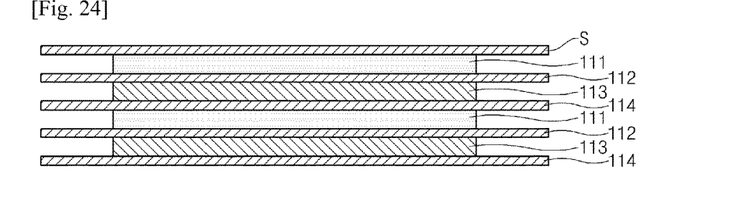
FIG. 24 is a cross-sectional view illustrating a stacked state of a separator on an uppermost electrode after stacking the first structure of the radical unit in FIG. 2 twice.

FIG. 23 is a cross-sectional view illustrating a stacked state of a separator on a first structure of the radical unit in FIG. 2, and FIG. 24 is a cross-sectional view illustrating a stacked state of a separator on an uppermost electrode after stacking a first structure of the radical unit in FIG. 2 twice.

As shown in FIGS. 23 and 24, a separator S is additionally stacked on the uppermost electrode of the cell stack part, and the top surface of the uppermost electrode and the bottom surface of the lowermost electrode are covered with separators. When the cell stack parts shown in FIGS. 23 and 24 are turned up and down, the separators S may be additionally stacked on the lowermost electrodes of the cell stack parts.

Figure 25:
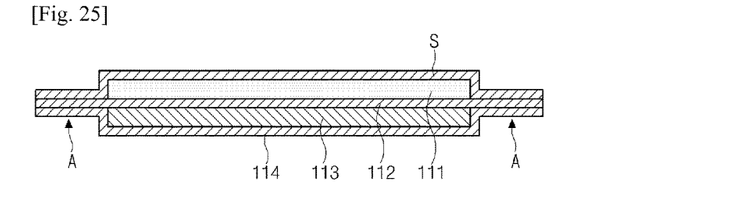
FIG. 25 is a cross-sectional view illustrating a cell stack part including a sealing part by attaching edge parts of the separators in FIG. 23.
Figure 26:
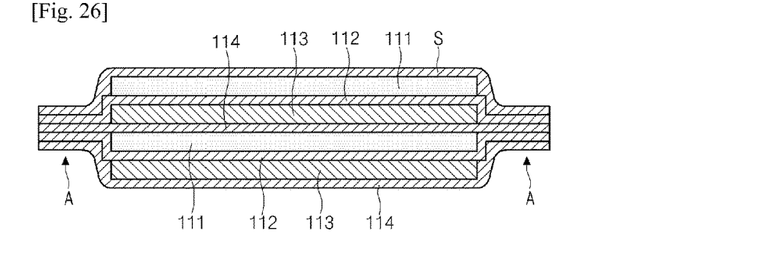
FIG. 26 is a cross-sectional view illustrating a cell stack part including a sealing part by attaching edge parts of the separators in FIG. 23.

The edge portions of adjacent separators in FIGS. 23 and 24 are placed to meet each other, and heat and pressure are applied to attach the edge parts of the separators, thereby forming sealing parts A illustrated in FIGS. 25 and 26.

Meanwhile, the sealing part A may be formed by attaching the edge parts of the separators included in one radical unit during manufacturing the electrode assembly. Alternatively, the sealing part A may be formed by stacking the radical units (of course, the auxiliary unit may be stacked together) to form the cell stack part and then, attaching the edge parts of all of the separators included in the cell stack parts together.

Hereinafter, an embodiment of the manufacturing method of the electrode assembly according to the present invention will be described in more detail.

First, a step of manufacturing one kind of radical units having an alternately stacked structure of the same number of electrodes and separators or two, or more kinds of radical units having an alternately stacked structure of the same number of electrodes and separators is conducted (S10).

Then, a step of placing the edge parts of the separators included in one radical unit to meet each other, and forming a sealing part A by applying heat and pressure is conducted (S20).

After that, a step of manufacturing a cell stack part is conducted by repeatedly stacking one kind of the radical units after performing Step S10 and Step S20, or by stacking two or more kinds of the radical units after performing Step S10 and Step S20 in order (S22).

As described above, after forming the sealing part A of the edge parts of the separators in each of the radical units by performing Steps S10, S20 and S22 in sequence, a cell stack part (an electrode assembly) having a stacked structure of the radical units may be manufactured.

In another embodiment of the manufacturing method of the electrode assembly according to the present disclosure, Step S10 is performed first as in the above embodiment, and a step of manufacturing a cell stack part by repeatedly stacking one kind of the radical units or by stacking two or more kinds of the radical units in order is performed (S14). Then, the edge parts of separators included in the cell stack part are placed to meet each other, and heat and pressure are applied to form a sealing part A (S30).

Through conducting Steps S10, S14 and S30 in sequence, a cell stack part is manufactured first by stacking the radical units without forming the sealing part A from the edge parts of the separators provided in the radical units, and then, the sealing part A is formed by using the edge parts of all the separators included in the cell stack part at the same time.

When the cell stack part shown in FIG. 4 is assumed to be manufactured by stacking the first radical units, and an additional separator S is stacked on the uppermost electrode of the first radical unit positioned at the uppermost portion of the cell stack part in FIG. 4, a cell stack part including the separators at both of the uppermost and the lowermost parts may be manufactured.

Meanwhile, the heat and the pressure applied to the edge parts of adjacent separators to form the sealing part A in Step S20 and Step S30, are preferably and respectively 50° C. to 100° C. and 10 gf/cm² to 20 gf/cm². In addition, the formation of a satisfactory sealing part A may be performed by only applying the heat and the pressure to the edge parts of the adjacent separators for 3 to 5 seconds in Step S20 or Step S30.

Accordingly, the time necessary for the manufacture of electrode assembly may not significantly increase due to the forming steps (S20 and S30) of the sealing part A.

A pressure of about 100 Kgf/cm² is necessary to attach the cathode and the anode, on the contrary, the above described pressure of 10 gf/cm² to 20 gf/cm² applied to the edge parts of the separators for the formation of the sealing part A is sufficient. Thus, the sealing part A may be formed by applying significantly less pressure than that applied to attach the cathode and the anode to the separator.

Hereinafter, experiments performed to verify the effects of the electrode assembly of the present disclosure will be described.

Comparative Example

In an electrode assembly in which the edge parts of separators were not overlapped, 20 to 24% of shrinkage ratio was found after heating at 150° C. for 30 minutes.

Experimental Example 1

In an electrode assembly in which the edge parts of separators were overlapped but not attached, and a sealing part A was not formed, 16 to 18% of shrinkage ratio was found after heating at 150° C. for 30 minutes.

Experimental Example 2

In an electrode assembly in which the edge parts of separators were attached, and a sealing part A was formed, 9 to 12% of shrinkage ratio was found after heating at 150° C. for 30 minutes.

When comparing the shrinkage ratio of Experimental Example 1 with that of Comparative Example, the shrinkage ratio of the separator was found to decrease when the edge parts of the separator were overlapped when compared to that of the separator when the edge parts of the separators were not overlapped and separately stacked between the cathodes and the anodes.

In addition, when comparing the shrinkage ratio of Experimental Example 2 with that of Experimental Example 1, the shrinkage ratio of the separator was found to decrease when the edge parts of the separators were overlapped and attached to form a sealing state when compared to that of the separators simply and doubly overlapped at the edge parts of the separators.

In the electrode assembly according to the present disclosure, the decreasing effect of the shrinkage ratio due to the overlapping and the decreasing effect of the shrinkage ratio due to the attachment of the separators are combined, and the shrinkage ratio of the separators may be markedly decreased.

Accordingly, the possibility of generating short between the cathode and the anode is very low, and the stability of the electrode assembly is improved in the present disclosure when compared to a common technology. In addition, an electrode assembly having improved stability when considering the common electrode assembly may be manufactured even though a separator having the same size or somewhat smaller size than the common technology is used.

Since the area of the separator necessary for the manufacture of an electrode assembly having the stability similar to that of the common technology is smaller than the common technology, the volume of a secondary battery may decrease.

In addition, since a separator having a smaller area when considering the common technology is used, the production cost of an electrode assembly may decrease.

While the present invention has been shown and described in connection with the exemplary embodiments, it will be apparent to those skilled in the art that modifications and variations can be made without departing from the spirit and scope of the invention as defined by the appended claims.

DESCRIPTION OF REFERENCE NUMERALS 100a-100n: cell stack parts
110a-110e: radical units
111: first electrode
112: first separator
113: second electrode
114: second separator
116: terminal electrode
117: terminal separator
121: first electrode material
122: first separator material
123; second electrode material
124: second separator material
130a-130f: first auxiliary units
140a-140f: second auxiliary units
A: sealing part

What is claimed is:

1. An electrode assembly, comprising:
a cell stack part having (a) a structure in which one kind of radical unit is repeatedly disposed, the one kind of radical unit having same number of electrodes and separators which are alternately disposed and integrally combined, or (b) a structure in which at least two kinds of radical units are disposed in a predetermined order, the at least two kinds of radical units each having same number of electrodes and separators which are alternately disposed and integrally combined,
wherein the one kind of radical unit of (a) has a four-layered structure in which a first electrode, a first separator, a second electrode and a second separator are sequentially stacked together or a repeating structure in which the four-layered structure is repeatedly stacked,
wherein each of the at least two kinds of radical units of (b) are stacked by ones in the predetermined order to form the four-layered structure or the repeating structure in which the four-layered structure is repeatedly stacked,
wherein the cell stack part includes an additional separator additionally stacked on an uppermost or lowermost electrode of the cell stack part,
wherein the separator has a larger size than the electrode to expose an edge part of the separator to the outside of the electrode and the separator,
wherein the edge parts of all the separators included in the cell stack part are directly attached to each other to form a sealing part such that the sealing part provides a laminate structure having an equal number of layers as the number of all separators in the cell stack,
wherein each electrode has a top surface, a bottom surface and an outermost edge extending between the top surface and the bottom surface, and
wherein the laminate structure conforms to the outermost edges of the electrodes such that the sealing part directly contacts the outermost edge of each electrode of the cell stack part.

2. The electrode assembly of claim 1, wherein the sealing part is formed by placing the edge parts of adjacent separators to meet each other and by applying heat and pressure.

3. The electrode assembly of claim 2, wherein an applying time of the heat and the pressure to the edge parts of the adjacent separators to form the sealing part is 3 to 5 seconds.

4. The electrode assembly of claim 2, wherein the pressure applied to the edge parts of the adjacent separators to form the sealing part is smaller than a pressure applied to attach the electrode to the separator in each of the radical units.

5. The electrode assembly of claim 1, wherein the radical unit is not bonded to the adjacent radical unit in the cell stack part, or is bonded to the adjacent radical unit in the cell stack part by means of a bonding strength differing from a bonding strength between the electrode and the separator in the radical unit.

6. The electrode assembly of claim 1, wherein the one kind of radical unit of (a) comprises a first radical unit having the four-layered structure or the repeating structure in which the four-layered structure is repeatedly stacked, and
wherein the cell stack part has a structure in which the first radical units are repeatedly disposed.

7. The electrode assembly of claim 1, wherein the at least two kinds of radical units of (b) comprises:
a second radical unit having the first electrode, the first separator, the second electrode, the second separator, the first electrode, and the first separator, which are sequentially disposed and integrally combined; and
a third radical unit having the second electrode, the second separator, the first electrode, the first separator, the second electrode, and the second separator, which are sequentially disposed and integrally combined, and
wherein the cell stack part has a structure in which the second radical unit and the third radical unit are alternately disposed.

8. The electrode assembly of claim 1, wherein the one kind of radical unit is provided in plurality and the plurality of one kind of radical units is classified into at least two groups having different sizes, and
wherein the cell stack part has a structure in which a plurality of steps is formed by stacking the one kind of radical units of (a) according to the size thereof.

9. The electrode assembly of claim 1, wherein the one kind of radical unit of (a) is provided in plurality and the plurality of the one kind of radical units is classified into at least two groups having different geometric shapes, and wherein the cell stack part has a structure in which a plurality of steps is formed by stacking the one kind of radical units of (a) according to the geometric shape thereof.

10. The electrode assembly of claim 1, wherein the electrode is attached to an adjacent separator in each radical unit.

11. The electrode assembly of claim 10, wherein an entire surface of the electrode facing the adjacent separator is attached to the adjacent separator.

12. The electrode assembly of claim 10, wherein the attachment between the electrode and the separator is provided by applying pressure to the electrode and the adjacent separator or by applying pressure and heat to the electrode and the adjacent separator.

13. The electrode assembly of claim 10, wherein adhesive strength between the electrode and the adjacent separator in the radical unit is greater than adhesive strength between the radical units in the cell stack part.

14. The electrode assembly of claim 10, wherein the separator comprises a porous separator base material and a porous coating layer that is applied to an entire surface of one side or both sides of the separator base material,
wherein the porous coating layer comprises a mixture of inorganic particles and a binder polymer, wherein the binder polymer binds and fixes the inorganic particles to each other, and
wherein the electrode is attached to the adjacent separator by the coating layer.

15. The electrode assembly of claim 14, wherein the inorganic particles of the porous coating layer have a densely packed structure to form interstitial volumes between the inorganic particles over the overall coating layer, and
wherein a pore structure is formed in the coating layer by the interstitial volumes that are defined by the inorganic particles.

16. The electrode assembly of claim 1, wherein the cell stack part further comprises a first auxiliary unit stacked on a terminal electrode that is an uppermost or a lowermost electrode,
wherein, when the terminal electrode is a cathode, the first auxiliary unit is formed by stacking from the terminal electrode, a separator, an anode, a separator, and a cathode in sequence, and
wherein, when the terminal electrode is an anode, the first auxiliary unit is formed by stacking from the terminal electrode, a separator and a cathode in sequence.

17. The electrode assembly of claim 16, wherein the cathode of the first auxiliary unit comprises:
a current collector; and
an active material coated on only one side facing the radical unit among both sides of the current collector.

18. The electrode assembly of claim 1, wherein the cell stack part further comprises a second auxiliary unit on a terminal separator that is an uppermost or a lowermost separator,
wherein, when the electrode contacting the terminal separator is a cathode in the radical unit, the second auxiliary unit is formed by stacking from the terminal separator, an anode, a separator and a cathode in sequence, and
wherein, when the electrode contacting the terminal separator is an anode in the radical unit, the second auxiliary unit is formed as a cathode.

19. The electrode assembly of claim 18, wherein the cathode of the second auxiliary unit comprises:
a current collector; and
an active material coated on only one side facing the radical unit among both sides of the current collector.

20. The electrode assembly of claim 1, wherein the cell stack part further comprises a first auxiliary unit stacked on a terminal electrode disposed on an uppermost or a lowermost electrode,
wherein, when the terminal electrode is a cathode, the first auxiliary unit is formed by stacking from the terminal electrode, a separator and an anode in sequence, and
wherein, when the terminal electrode is an anode, the first auxiliary unit is formed by stacking from the terminal electrode, a separator, a cathode, a separator and an anode in sequence.

21. The electrode assembly of claim 20, wherein the first auxiliary unit further comprises a separator at an outer side of the anode.

22. The electrode assembly of claim 1, wherein the cell stack part further comprises a second auxiliary unit on a terminal separator that is an uppermost or a lowermost separator,
wherein, when the electrode contacting the terminal separator is a cathode in the radical unit, the second auxiliary unit is formed as an anode, and
wherein, when the electrode contacting the terminal separator is an anode in the radical unit, the second auxiliary unit is formed by stacking from the terminal separator, a cathode, a separator, and an anode in sequence.

23. The electrode assembly of claim 22, wherein the second auxiliary unit further comprises a separator at an outer side of the anode.

24. The electrode assembly of claim 1, wherein the cell stack part further comprises a second auxiliary unit stacked on a terminal separator that is an uppermost or a lowermost separator, and
wherein, when the electrode contacting the terminal separator in the radical unit is an anode, the second auxiliary unit is formed by stacking from the terminal separator, a first cathode, a separator, an anode, a separator, and a second cathode in sequence.

25. The electrode assembly of claim 24, wherein the second cathode of the second auxiliary unit comprises:
a current collector; and
an active material coated on only one side facing the radical unit among both sides of the current collector.

26. The electrode assembly of claim 1, wherein the cell stack part further comprises a second auxiliary unit stacked on a terminal separator that is an uppermost or a lowermost separator, and
wherein, when the electrode contacting the terminal separator is a cathode in the radical unit, the second auxiliary unit is formed by stacking from the terminal separator, a first anode, a separator, a cathode, a separator, and a second anode in sequence.

27. The electrode assembly of claim 1, wherein the cell stack part having (a) the structure in which one kind of radical unit is repeatedly disposed is arranged such that one of the one kind of radical unit is in direct contact with another one of the one kind of radical unit, or (b) the structure in which at least two kinds of radical units are disposed in a predetermined order is arranged such that one of the at least two kinds of radical units is in direct contact with another of the at least two kinds of radical units.

* * * * *